No. 776,498. Patented December 6, 1904.

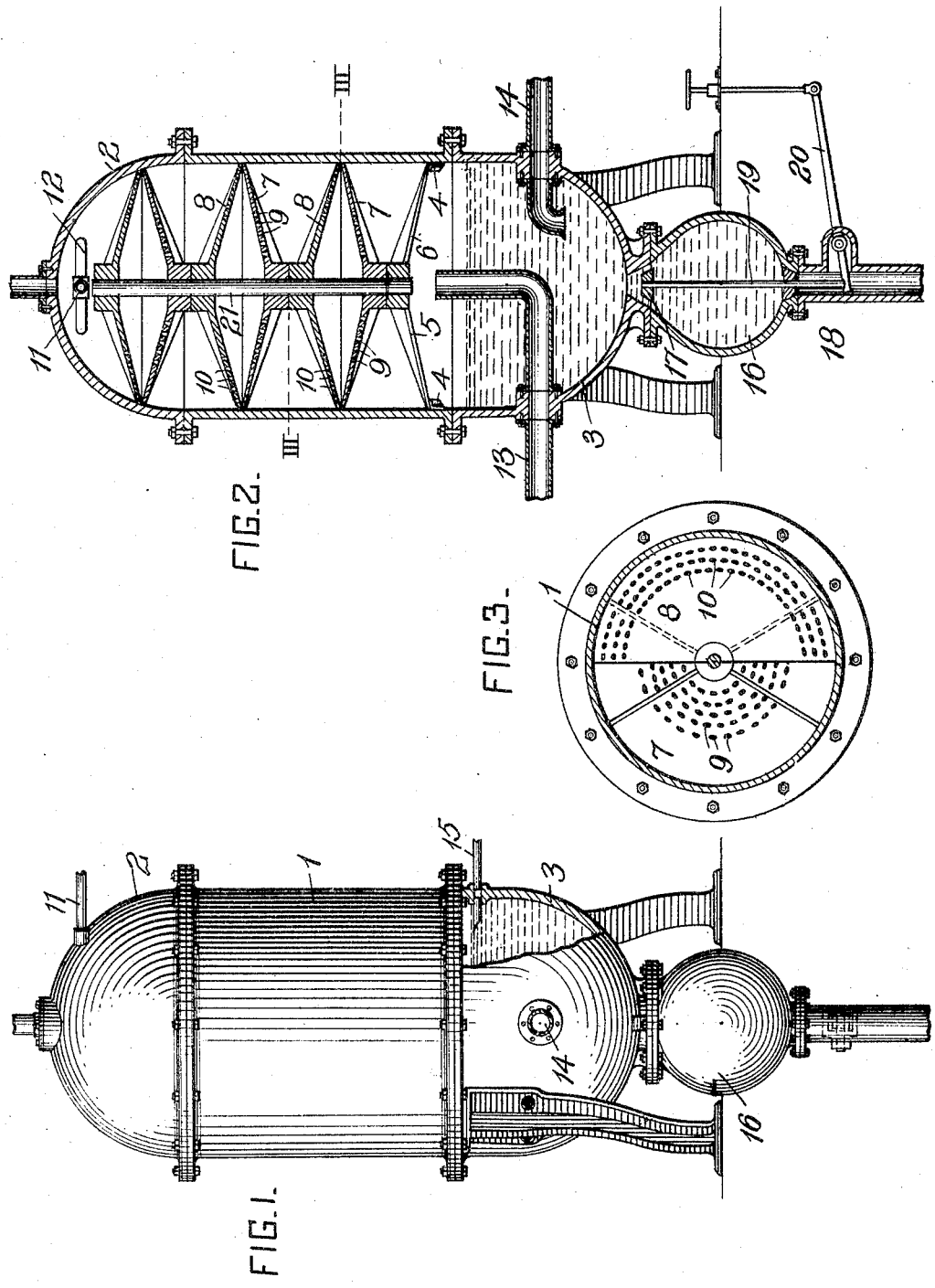

UNITED STATES PATENT OFFICE.

JOHN COYNE, OF ALLEGHENY, PENNSYLVANIA.

WATER-HEATER.

SPECIFICATION forming part of Letters Patent No. 776,498, dated December 6, 1904.

Application filed May 23, 1904. Serial No. 209,319. (No model.)

*To all whom it may concern:*

Be it known that I, JOHN COYNE, a citizen of the United States, residing at Allegheny, in the county of Allegheny and State of Pennsylvania, have invented or discovered certain new and useful Improvements in Water-Heaters, of which improvements the following is a specification.

The invention described herein relates to certain improvements in apparatus for condensing the exhaust-steam from engines, and has for its object a construction whereby an efficient transference of heat from the exhaust-steam to the condensing liquid is effected, thereby raising such liquid to a temperature at which carbonates, &c., are solidified.

It is a further object of the invention to provide for the separation of solid and other foreign matter from the heated water.

The invention is hereinafter more fully described and claimed.

In the accompanying drawings, forming a part of this specification, Figure 1 is an elevation of my improved condenser. Fig. 2 is a sectional elevation of the same; and Fig. 3 is a sectional plan view, the plane of section being indicated by the line III III, Fig. 2.

The apparatus consists of a cylindrical body 1 and upper and lower hemispherical heads 2 and 3, the heads being connected to the ends of the body by flanges and bolts, as shown. Lugs 4 are formed on the inner wall of the body near its lower end as supports for the tripod 5. The hub 6 of this tripod serves as a seat for the concavo-convex disk 7, provided at its center with a boss resting on the seat 6. The disk is arranged with its concave side up, and a similar disk 8 is oppositely arranged on the disk 7, the periphery of the disk 8 resting on the periphery of the disk 7. Two, three, or more pairs of these oppositely-arranged concavo-convex disks are arranged in the body portion of the apparatus, as shown in Fig. 2. The disks 7, which are arranged with their concave faces up, are provided with perforations 9 adjacent to their hubs or centers, while the disks 8, which are arranged with the convex sides up, have perforations 10 adjacent to their peripheries. By this construction—*i. e.*, arranging the perforations at or near the lowest portions of the disks—any liquid falling on the surfaces of the disks will flow down and through the perforations. These perforations are preferably made oblong and conical, as such form of opening tends to spread or diffuse a stream of water flowing through, and thereby insuring a more intimate contact of the steam and water. As the large ends of these conical perforations are down or in the direction of the discharge of water therethrough and the flow of such water consequently free, there will be little liability of the perforations being clogged with mineral deposits. The water is introduced through the pipe 11, having a ring-shaped nozzle 12 perforated so as to distribute the water in small streams on the surface of the upper disk.

The lower head forms the hot-well for the reception of condensed steam and water heated by the exhaust-steam, which is introduced through the pipe 13, having its inner end bent upward, so as to be above the level of any water contained in the hot-well, and so permitting a free flow of steam into the apparatus. The heated water is carried away from the hot-well by a pipe 14, entering the well below the normal level of water therein. An overflow-pipe 15 is provided, the inner end of the pipe being flared and flattened and arranged to lie in the plane of the normal water-level, so as to operate as a skimmer to remove any grease that may accumulate on the surface of the water.

A mud-drum 16, having converging inner surfaces and preferably made pear-shaped, is secured to the under side of the hot-well and is connected to the lowest point thereof. The passage between the hot-well and the mud-drum and the outlet of the latter are controlled by valves 17 and 18. Suitable mechanism is employed to open one valve and close the other simultaneously. In the construction shown these valves are arranged on a rod 19, which can be shifted as required by a lever 20 or other suitable means.

As the steam passes upward it passes through the openings or perforations in the disks, coming into contact with water flowing in the opposite direction. It will be observed that in passing from one set of perforations to the other the steam will flow diagonally through the chambers between adjacent disks and will be in contact with the water along the lower surfaces of said chambers. In the top chamber the steam must pass through the sprays of water from the ring nozzle before it can reach the outlet-pipe, around the end of which the ring nozzle is arranged.

If desired, a centering-rod 21, passing through the hubs of the disks, may be employed; but its use is not generally necessary if the disks are made of a diameter equal or approximately equal to the internal diameter of the cylindrical portion 1.

I claim herein as my invention—

1. A condensing apparatus having in combination an external shell, a series of removable concavo-convex disks arranged one upon the other, alternate plates having their concave faces up, and provided with conical openings having their large ends down, water supply and outlet pipes and steam inlet and outlet pipes, substantially as set forth.

2. A condensing apparatus having in combination an external shell, a series of removable concavo-convex plates arranged within the shell, alternate plates having their concave faces up, said plates having conical perforations alternately adjacent to their peripheries and to their centers, the large ends of the perforations being down, water supply and outlet pipes, and steam inlet and outlet pipes, substantially as set forth.

3. A condensing apparatus having in combination a shell, a series of alternately-arranged concavo-convex disks perforated alternately adjacent to the peripheries and to their centers, said disks being supported at the edges and centers alternately by the disks below, a water-supply pipe arranged above the disks, a hot-well arranged below the disks, steam inlet and outlet pipes, and an outlet-pipe from the hot-well, substantially as set forth.

4. A condensing apparatus having in combination an external shell, a series of removable concavo-convex disks arranged within the shell and supported at the edges and centers alternately by the disk below, a water-supply pipe, inlet and outlet pipes for steam and a hot-well arranged below the disks, substantially as set forth.

5. A condensing apparatus having in combination a shell, a mud-drum connected to the lower end of the shell, valves controlling the flow of water to and from the drum, means for simultaneously shifting said valves, a series of alternately-arranged concavo-convex perforated disks, a water-supply pipe arranged above the disks, steam inlet and outlet pipes, and a water-outlet pipe extending from the lower portion of the shell, substantially as set forth.

6. A condensing apparatus having in combination a cylindrical body portion, hemispherical upper and lower ends, a series of alternately-arranged concavo-convex perforated disks within the cylindrical body portion, a water-supply pipe arranged above the disks, a pear-shaped mud-drum connected to the lower head, valves controlling the flow of water to and from the drum, means for shifting said valves, steam inlet and outlet pipes connected to said heads, and a water-outlet pipe extending from the lower portion of the shell, substantially as set forth.

In testimony whereof I have hereunto set my hand.

JOHN COYNE.

Witnesses:
DARWIN S. WOLCOTT,
F. E. GAITHER.